United States Patent [19]

Baumann

[11] Patent Number: 5,586,485
[45] Date of Patent: Dec. 24, 1996

[54] COFFEE MACHINE

[75] Inventor: Heinrich Baumann, Solingen, Germany

[73] Assignee: Robert Krups GmbH & Co. KG, Solingen, Germany

[21] Appl. No.: 416,694

[22] PCT Filed: Aug. 11, 1994

[86] PCT No.: PCT/EP94/02685

§ 371 Date: Apr. 10, 1995

§ 102(e) Date: Apr. 10, 1995

[87] PCT Pub. No.: WO95/05109

PCT Pub. Date: Feb. 23, 1995

[30] Foreign Application Priority Data

Aug. 12, 1993 [DE] Germany .............................. 9312009 U

[51] Int. Cl.[6] .................................................. A47J 31/10
[52] U.S. Cl. ................................................ 99/295; 99/306
[58] Field of Search .............................. 99/295, 305, 306, 99/279, 280, 283, 300, 302 R, 304, 307; 426/433

[56] References Cited

U.S. PATENT DOCUMENTS 3,384,004  5/1968  Perlman et al. .
4,328,740  5/1982  Brill et al. ................................. 99/305
5,239,914  8/1993  Salomon ................................... 99/295
5,251,541  10/1993 Anson ....................................... 99/305
5,335,589  8/1994  Yerves et al. ............................. 99/295

FOREIGN PATENT DOCUMENTS 2311672  12/1976  France .
2628956  9/1989   France .
8912802  6/1990   Germany .

Primary Examiner—Robert W. Jenkins
Attorney, Agent, or Firm—McAulay Fisher Nissen Goldberg & Kiel, LLP

[57] ABSTRACT

The coffee machine has a water reservoir located in a housing, a heating device having electric regulating devices, a beverage collecting vessel which can be placed on a housing base, and a coffee brewing housing which is arranged above the beverage collecting vessel. The coffee brewing housing which can be swivelled out of the coffee machine housing is secured in the working position at the coffee machine housing by a manually actuated hold-back device which is spring-loaded in the locking direction. To enable a reliable triggering of the swiveling movement of the coffee brewing housing after it has been unlocked from the housing of the coffee machine without the use of spring elements which cause an undefined swiveling movement, the hold-back device is coupled with a push bar which acts on the coffee brewing housing in the swiveling out direction and is guided at the housing.

5 Claims, 3 Drawing Sheets

COFFEE MACHINE

BACKGROUND OF THE INVENTION

1. Field of the Invention

The invention is directed to a coffee machine with a water reservoir located in a housing, a heating device having electric regulating devices, a beverage collecting vessel which can be placed on a housing base, and a coffee brewing housing which is arranged above the beverage collecting vessel and can be swivelled out of the housing and is secured in the working position at the housing by manually actuated hold-back means which are spring-loaded in the locking direction.

2. Description of the Related Art

A coffee machine of the type mentioned above is known from U.S. Pat. No. 3,384,004. This coffee machine has a substantially C-shaped housing and a beverage collecting vessel can be placed on a housing base in the open space of the C-shaped housing cross section. A coffee brewing housing, in which a filter bag containing ground coffee is inserted, is located above the beverage collecting vessel, hot water being supplied to this coffee brewing housing via a line. In order to remove the used filter bag and insert a new filter bag containing ground coffee, the coffee brewing housing can be swiveled out of the housing of the coffee machine. For this purpose, hold-back means formed of a leaf-spring type latch and a handle connected therewith are arranged at the housing of the coffee machine, this latch engaging behind the rim of the coffee brewing housing in the working position so as to hold it in its working position. When actuating the hold-back means, the coffee brewing housing swivels out of the housing of the coffee machine by its own weight or in that it is acted upon by a spring, so that the interior of the coffee brewing housing is accessible to the user. In this prior art solution, the coffee brewing housing is held at the housing of the coffee machine so as to be swivelable in a downward direction and can be pressed, via a ring seal, against a cover plate which is stationary with respect to the housing, this working position being secured by the hold-back means. The brewing process may create a slight vacuum in the coffee brewing housing to an extent sufficient to prevent the coffee brewing housing from swiveling down out of the housing by gravity. However, in order to ensure the swiveling out movement after the disengagement of the hold-back means, the coffee brewing housing can be swiveled out of the housing of the coffee machine when the hold-back means are released via the handle by means of a pressing plate which rests on the filter bag and is actuated by spring force in the swiveling out direction.

OBJECT AND SUMMARY OF THE INVENTION

The object of the present invention is to enable a reliable triggering of the swiveling movement of the coffee brewing housing after it has been unlocked from the housing of the coffee machine without the use of spring elements which cause an undefined swiveling movement. This object is met, according to the invention, in that the hold-back means are coupled with a push bar which acts on the coffee brewing housing in the swiveling out direction and is guided at the housing. When the hold-back means are actuated to unlock the coffee brewing housing, a swiveling out movement of the coffee brewing housing relative to the housing of the coffee machine is effected at the same time so as to be synchronous with this actuating movement and compulsorily dependent thereon. In so doing, the swivel angle of the swiveling out movement, which is effected in the horizontal direction in the coffee machine according to the innovation, need only be large enough to allow the user to reach behind the wall of the coffee brewing housing which is flush with the wall of the coffee machine housing in the working position, so that the user can swivel out the coffee brewing housing into a position allowing the coffee filter to be changed without difficulty.

In order to achieve a push mechanism occupying a small space, the hold-back means are constructed according to another feature of the innovation as an angle lever which is supported at a pin of the housing and whose actuating arm projects from the housing by a catch head which engages over the rim of the coffee brewing housing so as to secure it, the other arm of the angle lever being constructed as a knee lever having the push bar. The arm of the knee lever constructed as a push bar is connected with the other arm adjoining the bearing eye of the angle lever by a film hinge.

In order to ensure that the hold-back means will return automatically to the blocking position after the user has let go and that the push bar will return to its inactive position, the pin which supports the angle lever and is stationary with respect to the housing is enclosed by a spring clip, one of whose legs is supported at an abutment which is stationary with respect to the housing, while the other leg acts in the blocking direction on the actuating arm provided with the catch head. For this purpose, the actuating arm of the angle lever has retaining projections which engage over the legs of the spring clip so as to hold them in position. The operational position of the spring clip is ensured in this way.

The invention is shown in the drawing by way of an embodiment example and is explained more fully in the following.

DESCRIPTION OF THE PREFERRED EMBODIMENTS

Figure 1:
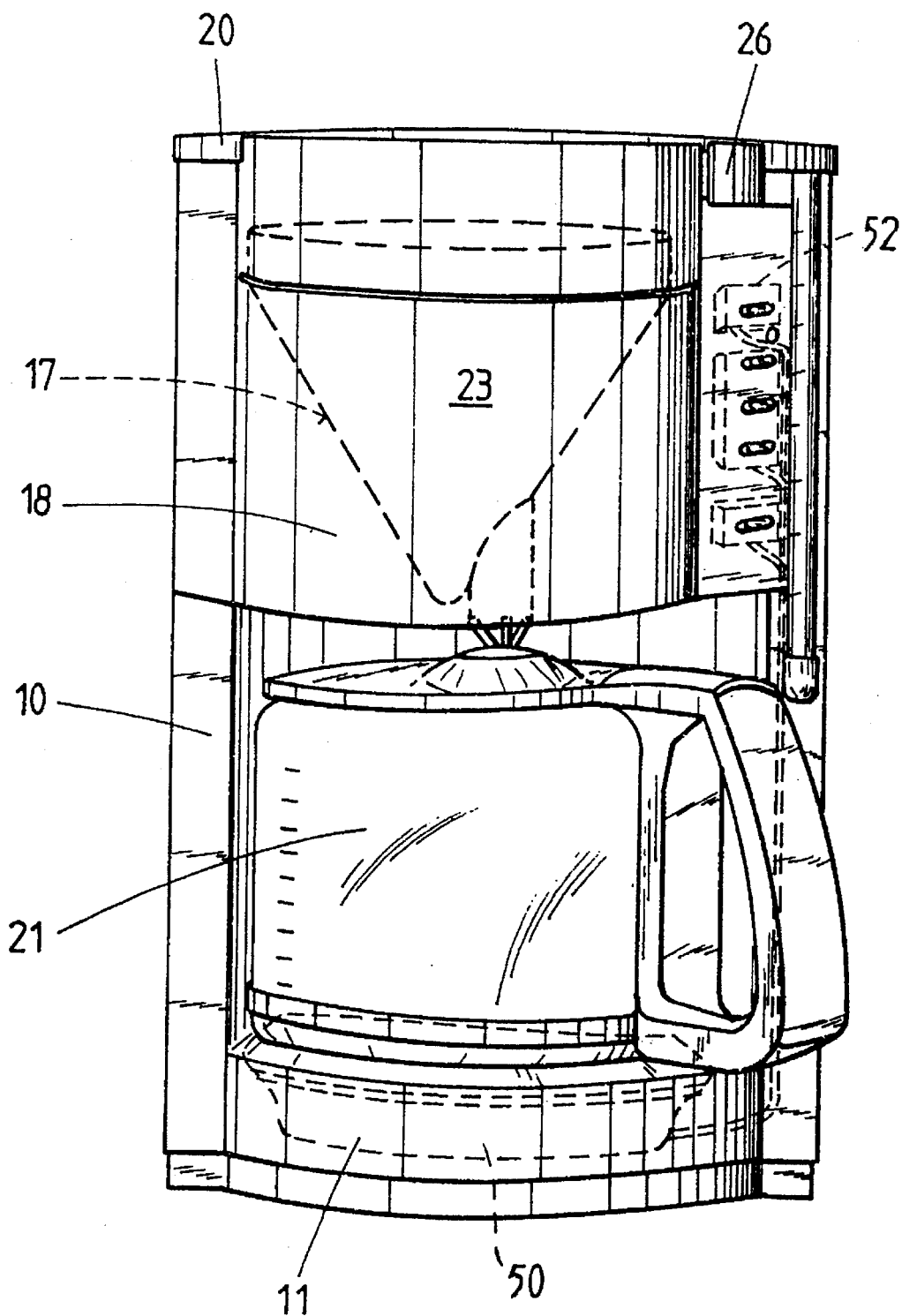
FIG. 1 is a perspective view of the coffee machine outfitted with the innovation, as seen from the front.

The coffee machine has a housing 10 which is shaped as a circle sector as seen in cross section and encloses in its lower region roughly half the circumference of a circular housing base 11 having a warming plate. The upper region of the sector-shaped housing 10 is constructed as a water reservoir 12 having at its base an inlet opening 13 which leads to a heating device 50 (having electric regulating devices 52) which is accommodated in the housing base 11 and is known per se. The heated water is transported from the heating device via an ascending tube 14 into an outlet chamber 15 arranged at the top and finally flows through the outlet opening 16 of the latter into a coffee brewing housing 18 in which a filter basket 17 is removably inserted. This coffee brewing housing 18 is connected at one side with the upper region of the housing 10 via a hinge 19 in such a way that it can swivel out horizontally. The sector-shaped housing 10 is covered at the top by a substantially circular housing cover 20, one half of which is connected in a stationary manner with the top of the housing 10 so as to cover the outlet chamber 15, while the other half of the housing cover 20 can be folded open to access the water reservoir 12. The free space located between the coffee brewing housing and the housing base 11 serves to receive a beverage collecting vessel 21 which can be placed on the warming plate in the housing base 11.

The disk-like housing part 22 arranged over the coffee brewing housing 18 forms, in combination with the housing cover 20 engaging over it, a flat chamber which is shaped like a cylindrical disk in some regions and encloses the outlet chamber 15. The front wall 23 of the coffee brewing housing 18 rises to the top of the housing cover 20 and has a projection 24 in the region of the cylindrical chamber containing the outlet chamber 15. A catch head 26 of the hold-back means 25 which projects beyond the housing part 22 and the front wall 23 of the coffee brewing housing 18 in its working position engages over this projection 24 and serves as a handle. These hold-back means 25 are constructed as an angle lever 27 whose bearing eye 28 encloses an axle pin 29 which is stationary with respect to the housing. The actuating arm 30 projects from the articulated eye 28 on one side, while the other lever arm 31 projecting away from the bearing eye 28 is constructed as a knee lever. The arm of the knee lever adjoining the bearing eye 28 is connected via a film hinge 33 with another arm constructed as a push bar 32. This push bar 32 penetrates a guide opening 40 in the vertical wall of the housing part 22 and can act upon the inner side of the front wall 23 of the coffee brewing housing 18 when the hold-back means 25 are actuated. In order to enable the hold-back means 2 to return automatically to the position shown in FIG. 2 after every actuation, the pin 29 which is connected in a stationary manner with the housing is enclosed by a spring clip 34, one of whose legs 35 is supported at an abutment 37 which is stationary with respect to the housing, while its other leg 36 acts on the actuating arm 30 in such a way that the coffee brewing housing 18 is blocked by the catch head 26. The actuating arm 30 has retaining projections 38 and 39 which hold the legs 35 and 36 and the spring clip 34 in the desired position. Further, a cover tongue 41 is arranged at the actuating arm 30 of the hold-back means 25. This cover tongue 41 covers the opening for the actuating arm in the housing part 22 when the hold-back means 25 are located in a blocking position maintaining the working position of the coffee brewing housing 18.

Figure 2:
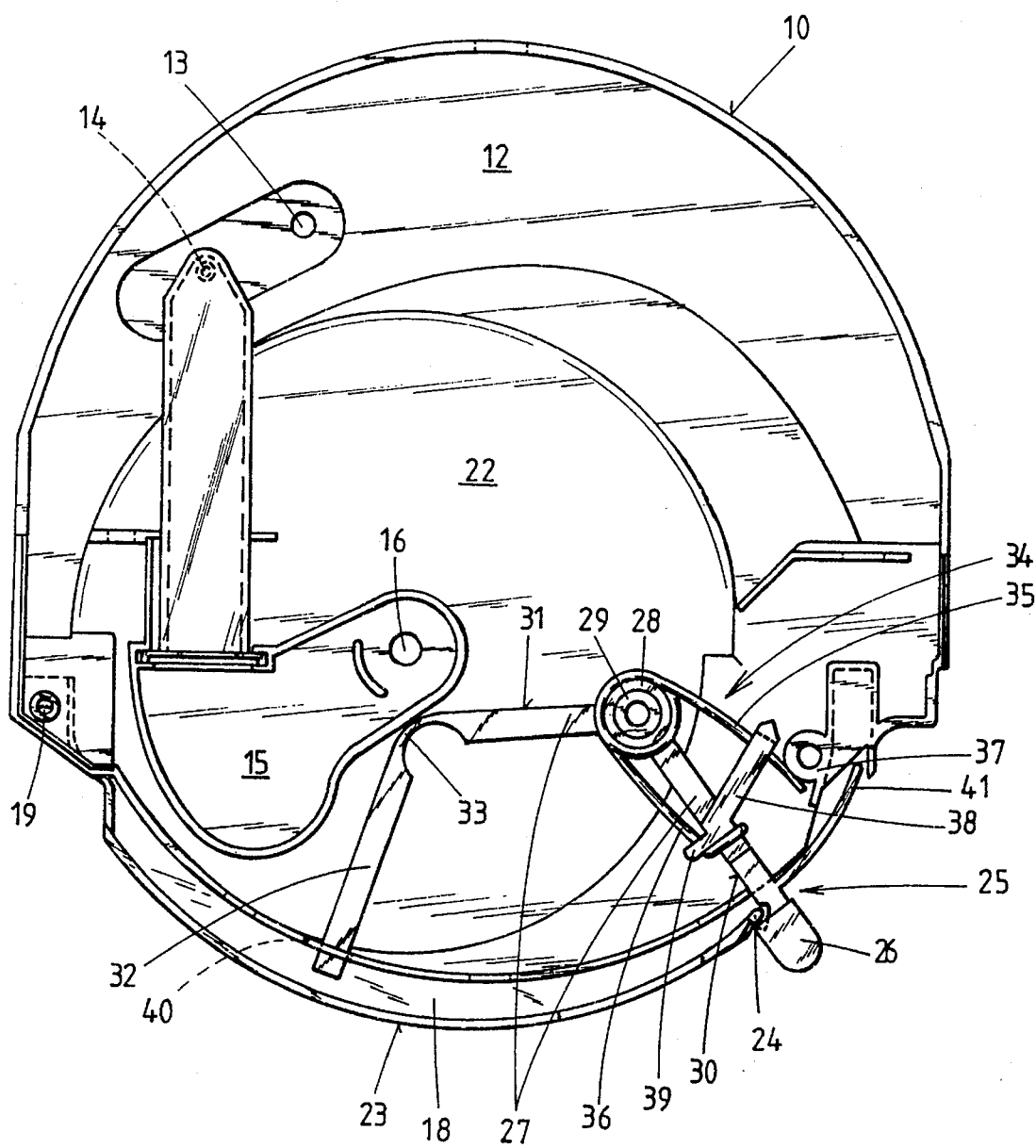
FIG. 2 is a top view of the coffee machine shown in FIG. 1 with the housing cover removed and the coffee brewing housing secured to the housing.
Figure 3:
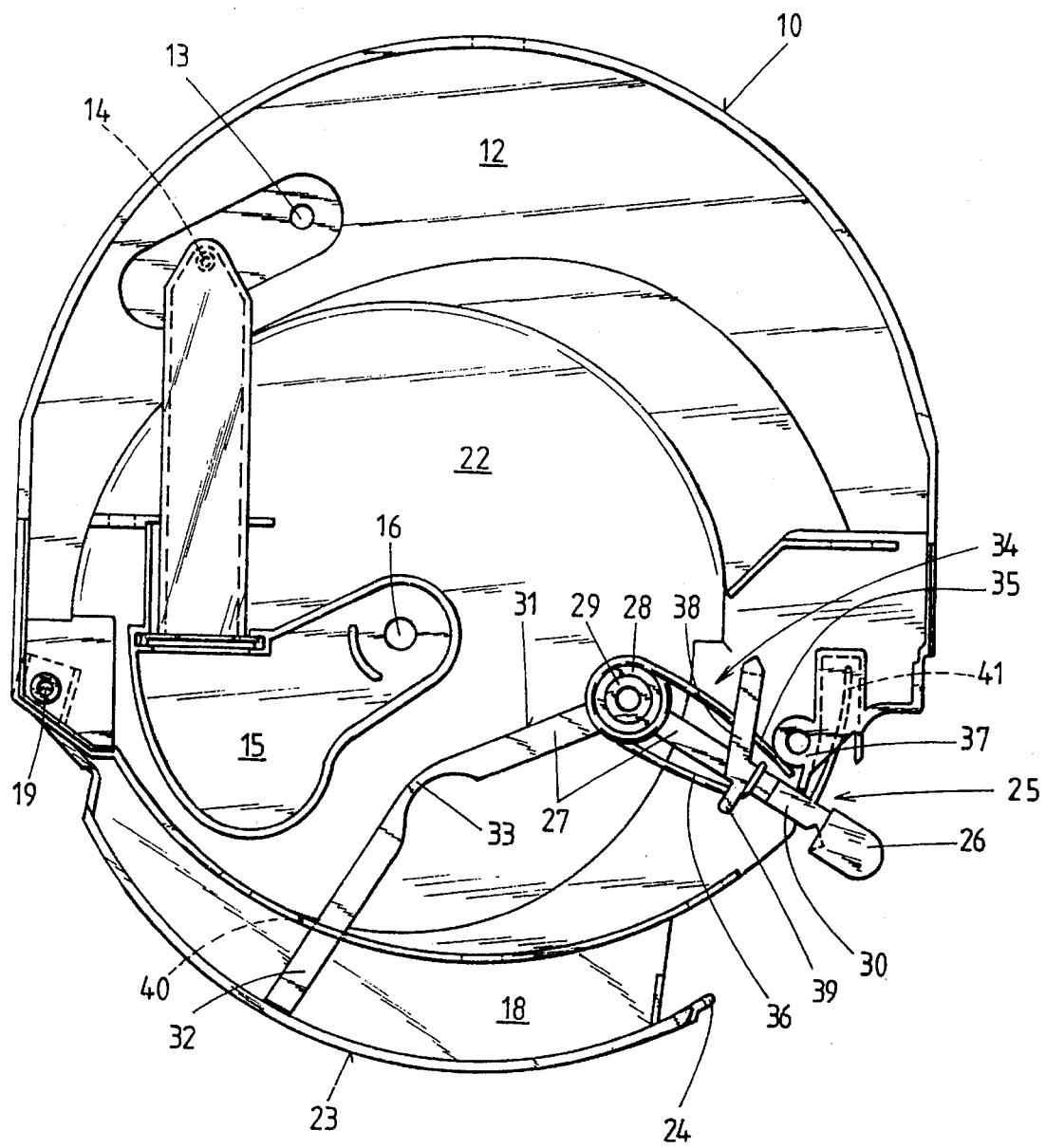
FIG. 3 is another top view of the coffee machine with the housing cover removed, in which the hold-back means are shown in the actuated position and a portion of the coffee brewing housing is moved into a horizontally swiveled out position relative to the coffee machine via the push bar of the coffee brewing housing.

Proceeding from the working position of the coffee brewing housing 18 shown in FIG. 2, the filter basket 17 in the coffee brewing housing can be emptied or refilled by operating the catch head 26 in the counterclockwise direction. In so doing, the catch head 26 releases the projection 24 at the front wall 23 of the coffee brewing housing 18 and, by continuing to swivel the hold-back means 25 via the catch head 26, the push bar 32 penetrating the guide opening 40 acts on the inner side of the front wall 23 of the coffee brewing housing 18 and moves the coffee brewing housing into the position shown in FIG. 3. The user may now let go of the catch head 26 which then swivels back into the position shown in FIG. 2 under the influence of the spring clip 34, while the coffee brewing housing 18 remains in the position shown in FIG. 3. Therefore, the user can now reach behind the projection 24 or the front wall 23 of the coffee brewing housing 18 and swivel it out along the fold-out position shown in FIG. 3 so that the filter basket 17 can be removed, e.g., to remove the used coffee grounds and insert fresh ground coffee in a new filter bag. The locking position shown in FIG. 2 can then be achieved again simply by swiveling back the coffee brewing housing 18.

As was already mentioned, the embodiment form described and shown above is given only as an example illustrating the subject of the present invention which is in no way limited thereby. Rather, there are many possible modifications and other constructions of the subject of the invention.

While the foregoing description and drawings represent the preferred embodiments of the present invention, it will be obvious to those skilled in the art that various changes and modifications may be made therein without departing from the true spirit and scope of the present invention.

What is claimed is:

1. In a coffee machine with a water reservoir located in a main housing, a heating device having electric regulating devices, a beverage collecting vessel which can be placed on a housing base, a coffee brewing housing which is arranged above the beverage collecting vessel, mounting means for connecting said coffee brewing housing to said main housing to enable a swiveling of said coffee brewing housing out of the main housing and manually actuated hold-back means for securing said coffee brewing housing in a working position at said main housing, a spring being provided for biasing said hold-back means towards a locking position, the improvement comprising:

a push bar;

said hold-back means being coupled with said push bar which acts on the coffee brewing housing in the swiveling out direction; and means at the main housing for guiding said push bar.

2. The coffee machine according to claim 1, wherein said hold-back means are constructed as an angle lever which is supported at a pin of the main housing and whose actuating arm projects from the main housing by a catch head which engages over the rim of the coffee brewing housing, the other lever arm being constructed as a knee lever having the push bar.

3. The coffee machine according to claim 2, to wherein the arm of the knee lever constructed as a push bar is connected with the other arm adjoining the bearing eye of the angle lever by a film hinge.

4. The coffee machine according to claim 2, wherein the pin which is stationary with respect to the main housing is enclosed by said spring in the form of a spring clip, one of whose legs is supported at an abutment which is stationary with respect to the main housing, while the other leg acts in the blocking direction on the actuating arm provided with the catch head.

5. The coffee machine according to claim 4, wherein the actuating arm of the angle lever has retaining projections which engage over the legs of the spring clip so as to hold them in position.

\* \* \* \* \*